US010387790B2

(12) United States Patent
Goyal et al.

(10) Patent No.: US 10,387,790 B2
(45) Date of Patent: *Aug. 20, 2019

(54) REDEPLOYABLE RESOURCE FORECASTING

(71) Applicant: International Business Machines Corporation, Armonk, NY (US)

(72) Inventors: Munish Goyal, Armonk, NY (US); Barbara S. O'Loughlin, Boulder, CO (US); Sanjay K. Prasad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/186,683

(22) Filed: Jun. 20, 2016

(65) Prior Publication Data
US 2017/0060638 A1 Mar. 2, 2017

Related U.S. Application Data

(63) Continuation of application No. 14/841,891, filed on Sep. 1, 2015, now Pat. No. 9,690,627.

(51) Int. Cl.
*G06F 9/46* (2006.01)
*G06N 7/00* (2006.01)
(Continued)

(52) U.S. Cl.
CPC .......... *G06N 7/005* (2013.01); *G06F 9/5027* (2013.01); *G06Q 10/04* (2013.01);
(Continued)

(58) Field of Classification Search
None
See application file for complete search history.

(56) References Cited

U.S. PATENT DOCUMENTS

| 5,623,404 A | 4/1997 | Collins et al. |
| 7,386,850 B2 | 6/2008 | Mullen |

(Continued)

FOREIGN PATENT DOCUMENTS

| CA | 2290888 A1 | 5/2001 |
| EP | 1290605 A1 | 3/2003 |

OTHER PUBLICATIONS

List of IBM Patents or Patent Applications Treated as Related. Filed Feb. 22, 2017. 2 pages.

(Continued)

*Primary Examiner* — Gregory A Kessler
(74) *Attorney, Agent, or Firm* — Isaac J. Gooshaw

(57) ABSTRACT

A method, computer program product and a computer system for forecasting resource usage is provided. A processor determines a job forecast. The processor determines a probability of a future usage for a first resource, wherein the first resource is currently assigned to a first job. The processor determines an assignment of a second resource to a forecasted job of the plurality of jobs, wherein the second resource is available for assignment to the forecasted job. The processor determines a probable utilization of the second resource, wherein the probable utilization of the second resource indicates the probability that the second resource will be deployed during assignment to the forecasted job. A processor, in response to the probable utilization of the second resource being below a predetermined value, generates a report including the assignment state of the second resource and probable utilization of the second resource by the forecasted job.

7 Claims, 5 Drawing Sheets

(51) Int. Cl.
 *G06F 9/50* (2006.01)
 *G06Q 10/06* (2012.01)
 *G06Q 10/04* (2012.01)
 *G06Q 10/08* (2012.01)
 *G06N 5/02* (2006.01)

(52) U.S. Cl.
 CPC ....... *G06Q 10/0631* (2013.01); *G06Q 10/087* (2013.01); *G06N 5/025* (2013.01)

(56) References Cited

U.S. PATENT DOCUMENTS

| | | |
|---|---|---|
| 7,590,937 B2 | 9/2009 | Jacobus et al. |
| 7,711,657 B1 | 5/2010 | Huberman et al. |
| 7,916,662 B2 | 3/2011 | Gao et al. |
| 8,015,043 B2 | 9/2011 | Cao et al. |
| 8,055,530 B2 | 11/2011 | Cao et al. |
| 8,108,248 B2 | 1/2012 | Seuken et al. |
| 8,458,005 B2 | 6/2013 | Grey et al. |
| 8,612,987 B2 | 12/2013 | Naik |
| 8,621,477 B2 | 12/2013 | Ferdous et al. |
| 8,671,037 B2 | 3/2014 | Hart, Jr. et al. |
| 8,706,650 B2 | 4/2014 | Ozog |
| 8,732,310 B2 | 5/2014 | Breitgand et al. |
| 8,781,977 B1 | 7/2014 | Huberman et al. |
| 8,809,836 B2 | 8/2014 | Pillarisetty |
| 9,356,155 B2 | 5/2016 | Sandhu |
| 9,640,663 B2 | 5/2017 | Chen |
| 2004/0139037 A1 | 7/2004 | Paleologo |
| 2006/0047815 A1 | 3/2006 | Hamadi |
| 2006/0167706 A1 | 7/2006 | Kenyon et al. |
| 2009/0299806 A1 | 12/2009 | Lu et al. |
| 2011/0288905 A1 | 11/2011 | Mrakas |
| 2014/0032255 A1 | 1/2014 | Hegazi |
| 2014/0052492 A1 | 2/2014 | Boss et al. |
| 2014/0196015 A1 | 7/2014 | Parsons et al. |
| 2014/0215080 A1 | 7/2014 | Alabiso et al. |

OTHER PUBLICATIONS

Akcay, et al. "Dynamic Assignment of Flexible Service Resources", Production and Operations Management, vol. 19, No. 3, May-Jun. 2010, pp. 279-304, ISSN 1059-1478, EISSN 1937-5956|10|1903|0279, DOI 10.3401/poms.1080.01095, Copyright 2009 Production and Operations Management Society.

Bossenbroek et al. "Grid Resource Allocation by Means of Option Contracts", IEEE Systems Journal, vol. 3, No. 1, March 2009, pp. 49-64.

Clearwater et al., "Swing Options: a Mechanism for Pricing IT Peak Demand", pp. 1-21, provided on Search Report dated Aug. 29, 2014.

Fallah et al., "Preemptive Resource Constrained Project Scheduling Problem with Uncertain Resource Availabilities: Investigate Worth of Proactive Strategies", pp. 646-650, Proceedings of the 2010 IEEE IEEM.

Joo et al., "Option Valuation Applied to Implementing Demand Response via Critical Peak Pricing", 1-4244-1298-6/07, © 2007 IEEE, pp. 1-7.

Sidola et al., "System Dynamic Methodological Approach for Design and Analysis of Risk in Supply Chain", pp. 495-500, 978-1-61284-952-2/11, © 2011 IEEE, IEEE Int'l Technology Management Conference.

"SAS® Energy Forecasting", provided in the Main Idea dated Dec. 16, 2014, SAS Institute Inc. World Headquarters, 4 pages, Copyright 2013.

"SAS® Service Parts Optimization", provided in the Main Idea dated Dec. 16, 2014, SAS Institute Inc. World Headquarters, 4 pages, Copyright 2006.

Appendix P: List of IBM Patents or Patent Applications Treated as Related, Dated Jun. 3, 2016, pp. 1-2.

U.S. Appl. No. 14/841,891, filed Sep. 1, 2015; "Redeployable Resource Forecasting".

REDEPLOYABLE RESOURCE FORECASTING

BACKGROUND OF THE INVENTION

The present invention relates generally to the field of resource forecasting, and more particularly to forecasting for resources that are redeployable.

Forecasting involves creating predictions about events, where the event has yet to occur. Forecasting in a supply chain can include predictions for both demand or supply of a given good or service. For example, one may forecast demand for a good or service, such as how many units of a product will be ordered or how long a service will be used. Similarly, one may forecast supply for a good or service, such as how many units of a product will be available or how many hours can a service be provided. For consumable products, the interaction between supply and demand is relatively easy to model. When a supplier sells a product to a consumer, the product is used and satisfies demand for a customer in the time period the product was sold. If demand for the product exists in later periods another unit of supply will need to be created by the supplier to satisfy demand. Redeployable resources, such as products or services that can be reused, however, create new considerations in modeling as a supply unit in one time period may be used again in other time periods.

SUMMARY

Embodiments of the present invention provide a method, system, and program product to forecast resource usage. A processor determines a job forecast. The processor determines a probability of a future usage for a first resource, wherein the first resource is currently assigned to a first job. The processor determines an assignment of a second resource to a forecasted job of the plurality of jobs, wherein the second resource is available for assignment to the forecasted job. The processor determines a probable utilization of the second resource, wherein the probable utilization of the second resource indicates the probability that the second resource will be deployed during assignment to the forecasted job. A processor, in response to the probable utilization of the second resource being below a predetermined value, generates a report including the assignment state of the second resource and probable utilization of the second resource by the forecasted job.

DETAILED DESCRIPTION

Figure 1:
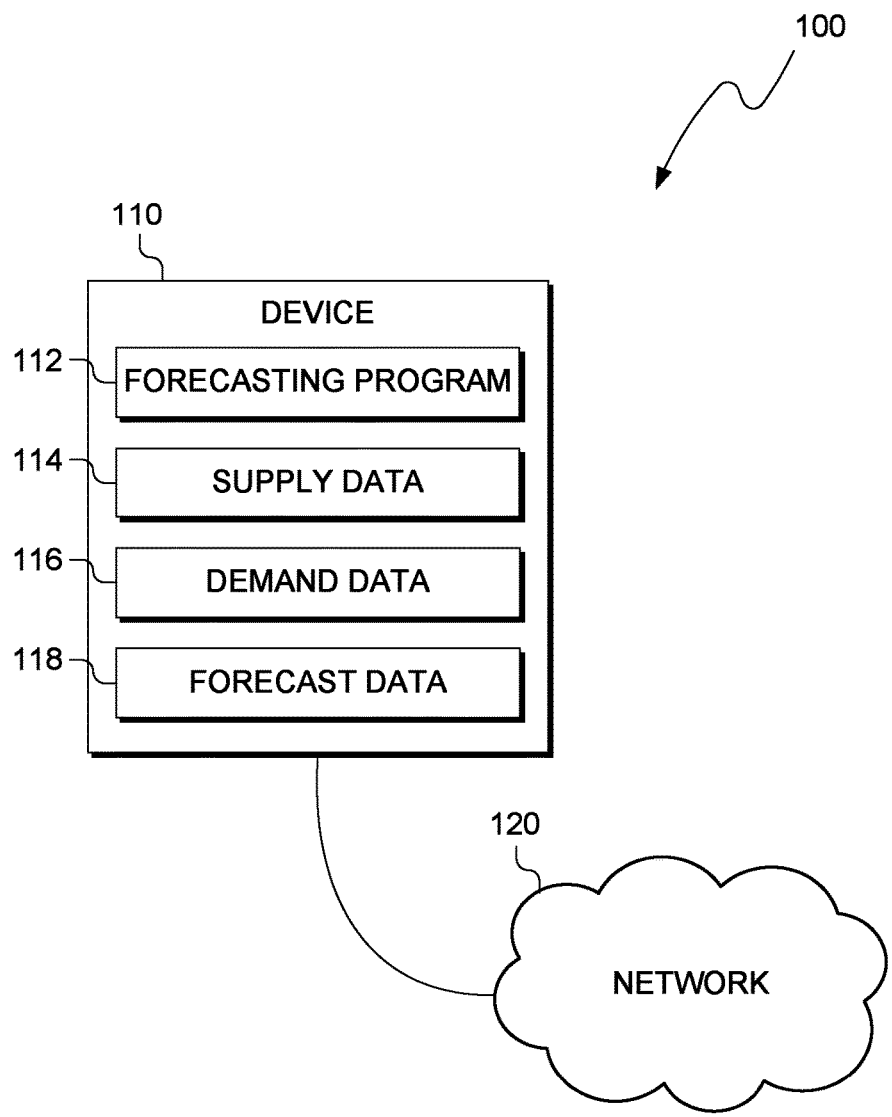
FIG. 1 is a functional block diagram illustrating a forecasting environment, in accordance with an exemplary embodiment of the present invention.

While solutions to forecasting are known they do not take into consideration products or services that can be redeployed or reused throughout different time periods in a forecast. Embodiments of the present invention recognize that, by determining the state of usage of a product or service through the time periods of a forecast, a forecast for a supply of redeployable resources can be determined. By modeling usage and assignment of the resources, embodiments of the present invention predict the state of a pool of redeployable resource. A given resource in the pool can be, at a given instant, either (i) currently assigned to or used by a job, (ii) unassigned, or benched, to any job, or (iii) retired, or exited, from the resource pool. When assigned, a resource is used for a job or task (e.g., a unit of demand). During its lifetime, a resource will be used in a variety of conditions based on the jobs that it is assigned to. Consequently, each job affects the resource differently. As such, the assignment of a resource to a job impacts the resource and, furthermore, the resource's ability to be redeployed in future jobs. By modeling both the usage of a resource via assignment to jobs and the state of the resource as a result of the assignment, embodiments of the present invention provide a forecast for redeployable resources over a given time frame or horizon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes device 110 connected over network 120. Device 110 includes forecasting program 112, supply data 114, demand data 116, and forecast data 118.

In various embodiments of the present invention, device 110 is a computing device that can be a standalone device, a server, a laptop computer, a tablet computer, a netbook computer, a personal computer (PC), or a desktop computer. In another embodiment, device 110 represents a computing system utilizing clustered computers and components to act as a single pool of seamless resources. In general, device 110 can be any computing device or a combination of devices with access to supply data 114, demand data 116 and forecast data 118 and is capable of executing forecasting program 112. Device 110 may include internal and external hardware components, as depicted and described in further detail with respect to FIG. 4.

In this exemplary embodiment, forecasting program 112, supply data 114, demand data 116 and forecast data 118 are stored on device 110. However, in other embodiments, forecasting program 112, supply data 114, demand data 116 and forecast data 118 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between forecasting program 112, supply data 114, demand data 116 and forecast data 118, in accordance with a desired embodiment of the present invention.

In various embodiments, forecasting program 112 determines a forecast of resources' state and assignment for one or more time periods over a forecasting horizon. A forecast includes the state of each resource and, in some scenarios, assignment of the resource to a job for various time periods in the forecasting horizon. Forecasting program 112 receives a forecasting horizon from a user. The forecasting horizon includes one or more time periods starting from the present date to generate a forecast for each time period. In some embodiments, the time periods are uniform (e.g., weekly or monthly forecasting). In other embodiments, the time periods are user defined (e.g., a short term one week forecast is included with a long term quarterly forecast). For each period, forecasting program 112 determines a prediction for usage and assignment of the resources in a given resource pool. The resources in a resource pool are each modeled and stored in supply data 114.

In various embodiments, supply data 114 includes information describing one or more resources in a resource pool. Supply data 114 includes the state of each resource in the resource pool at the current date that the forecast is generated. A resource can be in one of three states: (i) assigned, (ii) benched, or (iii) exited. An assigned resource is currently used in a job. A benched resource is currently unassigned to a job, however, is capable of being assigned to a job at a later time. An exited resource is a resource that is no longer available to be assigned to any jobs (e.g., the resource is retired from the resource pool). For example, a resource pool includes a fleet of rental cars supplied by a rental agency. Assigned cars include cars rented to a company for use during the time period. Unassigned cars include cars currently sitting in the rental agencies lot and ready to be rented by a company. Exited cars include cars that, at the given time period, cannot be rented by a company (e.g., a car is in need of repairs). As discussed herein, a resource may be any product, materials, service, staff, or other assets that are assigned to a job. Furthermore, a resource may be, given certain conditions, reused or redeployed to other jobs at different time periods or during a given time period.

In various embodiments, supply data 114 also includes information describing the current and historic attributes of each resource in the resource pool. Resource attributes include, but are not limited to, (i) an identification or tracking number of each resource, (ii) a type or category of the resource, (iii) assignment history of the resource, (iv) condition of the resource, (v) skills or features of the resource, and (vi) the current state of the resource (e.g., assigned, benched, or exited). An identification number includes a unique identifier for the resource. The identifier enables tracking of the resource during forecasting. A type or category includes descriptors indicating the qualities or capabilities of the resource. For example, a contract employee is associated with a job title or list of tasks the resource is capable of performing. An assignment history includes the job assignments and the length of the assignments the resource has been assigned to. A condition of a resource includes descriptors indicating qualities or situations that may affect assignment of the resource. For example, a car for a rental agency includes conditions of components of the car (e.g., mileage, age of tires, etc.). A skill or feature of the resource include functions or capabilities of the resource to perform a job.

In various embodiments, demand data 116 includes information describing the attributes of current and historic jobs requiring one or more resources from the resource pool. Job attributes include, but are not limited to, (i) a job identification name or number, (ii) a type or category of the job, (iii) a skill or feature requirement, (iv) an expected job duration, (v) an observed job duration, (vi) a job complexity or intensity measurement, (vii) resources assigned to the job, and (viii) a job completion score of the job. A job identification name or number includes a unique identifier for the job. The type or category provides a description of the job. The skill or feature requirements provide the skill or features required of a resource to be assigned to the job. For example, a job for a rental car requires a certain amount of cargo space, or a contract employee is required to have expert knowledge of an application. The expected job duration includes the amount of time it will take a resource to complete a job. The observed job duration includes previous measurements of completion time for the job or jobs of a similar category or skill requirement. The job complexity of intensity measurement includes metrics describing the amount of wear or fatigue expected of the resource during assignment to the job. For example, a contract employee in a call center may field more calls than another job at the call center. The resources assigned to a job indicate the resources, via the resources' identification names or numbers, currently performing the job. The job completion score indicates the amount of completion or the time left to completion of the job.

In various embodiments, forecasting program 112 determines a forecast for resources in a resource pool over time for a given forecasting horizon. Forecasting program 112 retrieves supply data 114 to identify the current state (i.e., assigned, benched, or exited) of each resource. Forecasting program 112 retrieves demand data 116 to identify current jobs that a resource in the resource pool may be assigned to. Each job has attributes, such as for type or features of a particular resource, that must be matched by a resource. If a resource matches the attributes of a job, then the resource may be assigned to the job. Furthermore, prior to determining a forecast, a job may be currently assigned one or more resources (e.g., as indicated by the attributes of the job).

In various embodiments, forecasting program 112 determines a forecasting recursively over the forecasting horizon. Forecasting program 112 determines a forecast for the first period. Based on the forecasted results for supply data 114 and demand data 116 for the first period, forecasting program 112 determines a forecast for the following period. For example, forecasting program 112 retrieves the forecasted results from the first period (e.g., the states of each resource and the predicted assignments previously predicted for the next period). Forecasting program 112 then determines new states and assignments for the following period. Forecasting program 112 continues to recursively make predictions, using the predicted results from prior periods, until forecasting program 112 determines a forecast for each period in the forecasting horizon. As such, the recursive nature of forecasting program 112 provides a better interaction between demand and supply over time with the forecast.

In various embodiments, based on the current jobs in demand data 116, forecasting program 112 determines a demand forecast for each period in the forecasting horizon. The demand forecast includes the amount of jobs, for a given type or requirement, that forecasting program 112 determines will be requested during a given period of the forecast. Forecasting program 112 retrieves both current and historic jobs stored in demand data 116. Forecasting program 112 identifies trends and other variations in demand data 116 to determine predictions for the future jobs in each period of the forecast. For example, forecasting program 112 uses a time-series forecasting algorithm, such as regression analysis, to determine a forecast of demand (e.g., the amount and type of jobs for each period). As another example, forecasting program 112 uses an artificial intelligence algorithm, such as pattern recognition, to determine a forecast of demand. One of ordinary skill in the art will recognize that any forecasting technique or algorithm may be used to determine a demand forecast of jobs without deviating from the invention. Example forecasting techniques or algorithms include, but are not limited to, one of or a combination of the following: moving average, weighted moving average, regression analysis, extrapolation, linear prediction, neural networks, machine learning, data mining or pattern recognition.

In various embodiments, forecasting program 112 determines a predicted state for each assigned resource for one or more periods for a given forecasting horizon. For a given resource that is currently assigned to a job, forecasting program 112 determines probabilities that the resource will (i) be benched before the next period, (ii) exit the resource pool before the next period, and (iii) maintain assignment for the next period. Forecasting program 112 generates a random forest model for each resource assignment during the current period. A random forest model is based on a decision tree including the attributes of both the resource and the job the resource is assigned to. Based on the decision tree, a predicted state (e.g., assigned, benched or exited) is a result for each path. For example, if the condition of the resource will exceed the usability of the resource, based on the intensity or duration of the job, then the decision tree has a path that the resulting state of the resource is "benched". Conversely, if the resource would not exceed the usability of the resource during the assigned job, then decision tree would follow the path where the state of the resource would remain "assigned", given the job is not completed.

Take the scenario where a car is to be rented to a client. As a resource in this scenario, a car is assigned to a variety of historic jobs that will accrue mileage. In one case, the car requires maintenance after the mileage reaches a certain level. Once the mileage reaches another certain level, the car requires repairs and cannot be assigned during these repairs (i.e., the car is "benched"). As another path in the decision tree, if the mileage reaches yet another even higher level, the car is removed from service by the car rental agency (i.e., "exited"). If neither condition is met, then the car is assigned to the job (i.e., "assigned").

In various embodiments, the decision tree includes a variety of decisions based on the attributes of the resource and the job the resource is assigned to. Each decision determines a resulting state of the resource given the attributes of the resource and the job. In embodiments where different types of resources or jobs are included in the forecast, forecasting program 112 includes a decision tree for each type. Each decision tree is designed to determine the resulting state of an assigned resource for the next period, based on the current and historic attributes of the resource and job that are assigned. In various embodiments, forecasting program 112 prunes, or removes, a random subset of paths in the decision tree. Forecasting program 112 prunes the decision tree multiple times, with each instance of pruning including some portions of the decisions tree and excluding other portions. Each pruned tree creates multiple decision trees that are a subset of the overall, or master, decision tree. In some embodiments, more than one master decision tree are pruned to improve performance.

In various embodiments, forecasting program 112 determines that state of a resource for each pruned tree. Forecasting program 112 aggregates the results for all pruned decision trees to determine a probability for each state the assigned resource will be during the next period. For example, forecasting program 112 generates one hundred pruned trees. Forecasting program 112 populates the one hundred pruned trees with the attributes of the assigned resource and job. After population, thirty pruned trees indicate that the assigned resource will be benched during the next period; ten pruned trees indicate the resource will exit the resource pool during the next period; and sixty pruned trees indicate the resource will continue to be assigned during the next period. As such, forecasting program 112 aggregates the results of the pruned trees and determines that the probability of the resource's state for the next period to be 30% the resource will be benched, 10% the resource will exit the resource pool, and 60% the resource will continue assignment to the job.

In various embodiments, forecasting program 112 generates a plurality of supply scenarios based on the probabilities of the state of each resource. Forecasting program 112 generates a plurality of scenarios for each resource. Each supply scenario represents the state the resource may be at the next period in the forecast. Furthermore, the distribution of supply scenarios generated reflect the probabilities for the state that the resource is predicted to be at during the next period in the forecast. For example, forecasting program 112 determines that a resource is 20% likely to stay assigned, 30% likely to be benched, and 50% to be exited at the next period in the forecasting horizon. Forecasting program 112 generates ten supply scenarios that represent possible outcomes, or the resulting state, the resource will be during the next period. Forecasting program 112 assigns two scenarios to result in continued assignment, three scenarios the resource will be benched, and five scenarios the resource will exit the resource pool. As such, the number of scenarios of each state prediction reflect the distribution of probabilities previously determined. As one skilled in the art will appreciate, any number of scenarios can be generated. The amount of scenarios are used to capture the possibilities the state of a resource will be next period in the forecast. When assignment of jobs is determined, as discussed herein, the amount of possible scenarios provides a more flexible model, however adds to the complexity and time for the assignment to be solved. One skilled in the art will recognize that the choice of the number of scenarios can be affected by this decision.

In various embodiments, forecasting program 112 determines a plurality of demand scenarios based on demand data 116 and the forecasted demand for the next period in the forecast. For each job forecasted to begin in the next period, or current or predicted jobs that are not assigned a resource, forecasting program 112 creates a demand scenario for the job including the type and other attributes of the resource needed for the job. Furthermore, for resources that are indicated as exiting the current period, forecasting program 112 generates one or more demand scenarios to backfill the demand the exited resource previously fulfilled. In some embodiments, forecasting program 112 creates a plurality of demand scenarios for a job. For example, forecasting program 112 creates multiple scenarios to represent possible changes in the job, such as changes in completion or duration.

In various embodiments, forecasting program 112 determines an assignment of supply scenarios to demand scenarios for the next period. Forecasting program 112 maximizes the number of assignments for the next period. When assigning a supply scenario to a demand scenario, any other supply scenarios associated with the supply unit in the assignment or demand scenarios associated with the demand unit in the assignment are removed from the assignment process. Furthermore, when determining an assignment, forecasting program 112 determines if the assignment is feasible. Forecasting program 112 determines if the requirements of the job are fulfilled by the skills or feature of the resource. For example, a temporary employment agency has workers with a variety of skill. Forecasting program 112 ensures the employee assigned to a job has the necessary skills required by the job.

In some scenarios, forecasting program 112 generates one or more demand scenarios where the job is completed during the forecasted period. For example, a job at the beginning of the period is partially finished and the period is set at one week long. A demand scenario for the job indicates that only three days are needed to complete the job. In such scenarios, forecasting program 112 assigns the resource in the supply scenario to two demand scenarios for two different jobs during the same period. In the above example, forecasting program 112 determines another demand scenario for the resource, where the resource can also fulfill the requirements of the other job. Forecasting program 112 assigns the job to the matching demand scenario similarly to describe herein, however the assignment time of the resource is partially split between the two separate jobs during the period.

In other scenarios, forecasting program 112 determines a probability that a resource will be utilized during assignment for each demand scenario. For example, a piece of equipment may be rented to a customer, but the customer may not actually use the equipment during the time period. Based on the assigned job, forecasting program 112 determines a probability that a resource will be utilized during assignment, where the probability indicates the percentage the resource will be deployed by the job requestor (e.g., a 60% chance the resource will be utilized for the job during the current period). In some cases, forecasting program 112 determines an assignment of supply scenarios and demand scenarios to maximize overall utilization of resource by jobs. In other cases, such as when maximizing the number of assignments, forecasting program 112 analyzes the utilization probability. For assignment of resource to jobs with a low probability of utilization for the resource, forecasting program 112 generates a report including jobs with assigned resources that have a low probability of utilization during the period (e.g., assignments where utilization is below 50% for the period). A user of forecasting program 112 can determine a new assignment of resource based on the report.

In some embodiments, forecasting program 112 determines assignment of resources and jobs based on a given strategy or set of rules. In order to account for business decisions or strategies a supplier or purchaser in the assignment process may make, forecasting program 112 includes additional requirements before assigning a supply scenario to a demand scenario. For example, a high-end chauffeur business may only rent new or slightly used cars. Forecasting program 112 includes an additional rule for demand scenarios associated with the chauffeur that supply scenarios for car rental resource be only assigned if the age of the resource (i.e., the car) is below a certain value (e.g., only car less than two years old are assigned to the demand scenarios of the chauffeur).

In various embodiments, forecasting program 112 aggregates the assigned supply and demand scenarios, unassigned supply and demand scenarios, and exited supply scenarios to determine the state of resource and jobs for the next period. Forecasting program 112 determines the state of each resource and job for the next period based on the aggregation. Forecasting program 112 updates the resource pool of supply data 114 for each resource based on the aggregation. For each resource that is assigned by the assignment process, forecasting program 112 sets the state of the resource to assigned. For each unassigned resource by the assignment process, forecasting program 112 sets the state of the resource to unassigned. For each resource that exits the supply pool, forecasting program 112 sets the state of the resource to exited. Forecasting program 112 updates the demand data 116 of jobs with demand scenarios for the next period. For assigned jobs, the job remains in the demand for the next period. For unassigned jobs, the job is set to unfulfilled for the next period. Forecasting program 112 determines if the job will be completed based on attributes of the assigned jobs and resources. Forecasting program 112 determines if the job will be completed, and if so, removes the job for demand data 116 for the next period. In various embodiments, based on the determined assignments for the next period, forecasting program 112 updates the attributes of the jobs in demand data 116 and resources in supply data 114. For example, based on the job in the assignment, forecasting program 112 updates the resources assigned to the job to reflect the amount of use the resources will incur as a result of performing the job for the current period.

In various embodiments, forecasting program 112 continues generating forecasts for later periods in the forecasting horizon until the end of the horizon is reached. Forecasting program 112 takes the job assignments and predicted states of resources from the previous period and bases the predictions and assignments of resources for the next period. Once the forecasting horizon is reached, forecasting program 112 stores the predicted states and assignments in forecast data 118, generating a report providing the information indicated in forecast data 118. Forecast data includes supply data 114 and demand data 116 for all predicted period in the forecast. Forecast program 112 provides the amount of each resource type that is in each of the three resource types for each period. Additionally, forecasting program 112 provides the assignment predictions for each resource or a group of resources (e.g., the type of resources), thereby providing the predicted usage of a resource or resource group throughout the forecasting horizon. As a result, forecasting program 112 provides the availability of benched resources so that a user can make allocation decisions for free resources to jobs not included in the forecast.

Figure 2A:
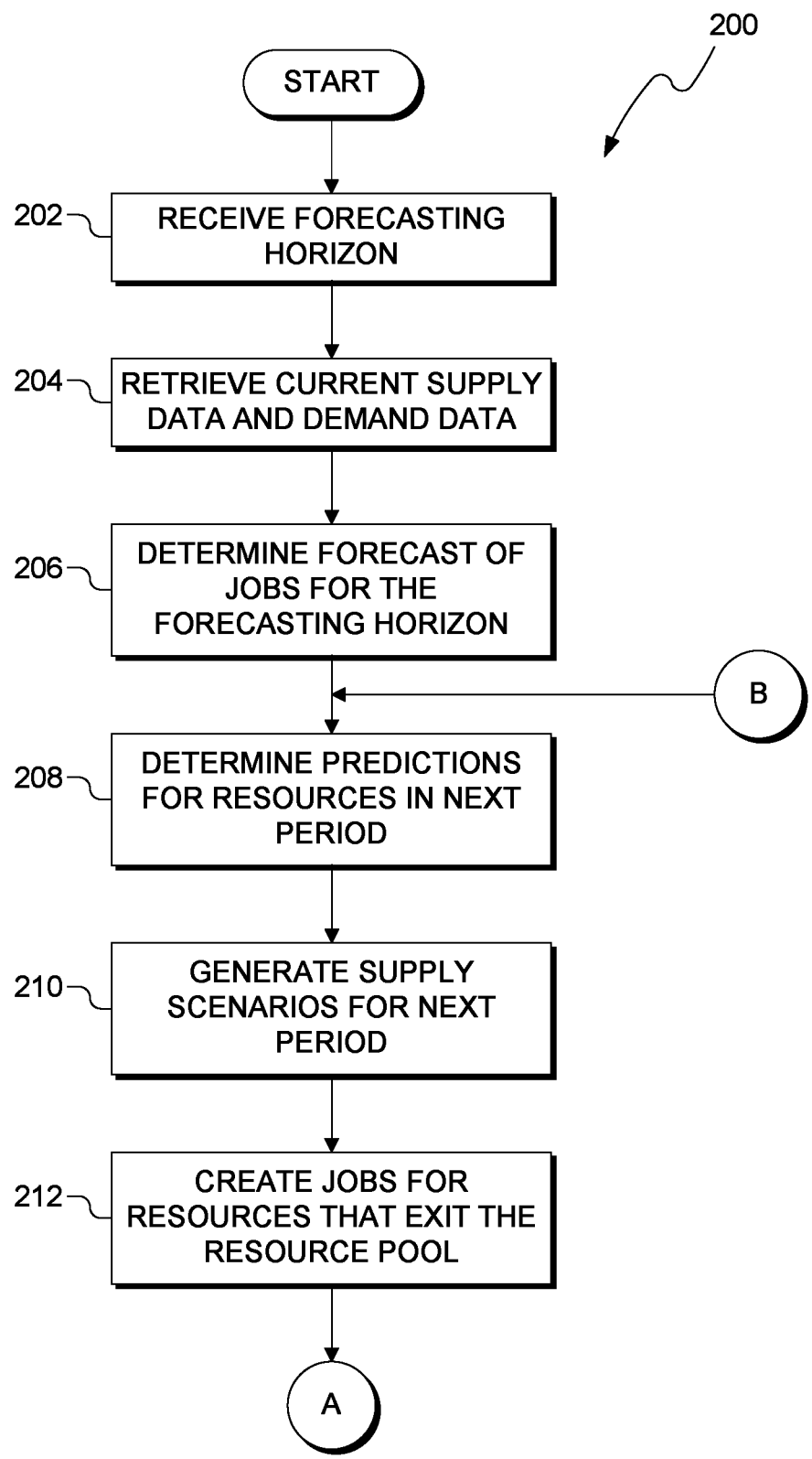
FIGS. 2A & 2B illustrates operational processes of a forecasting program, on a computing device within the environment of FIG. 1, in accordance with an exemplary embodiment of the present invention.
Figure 2B:
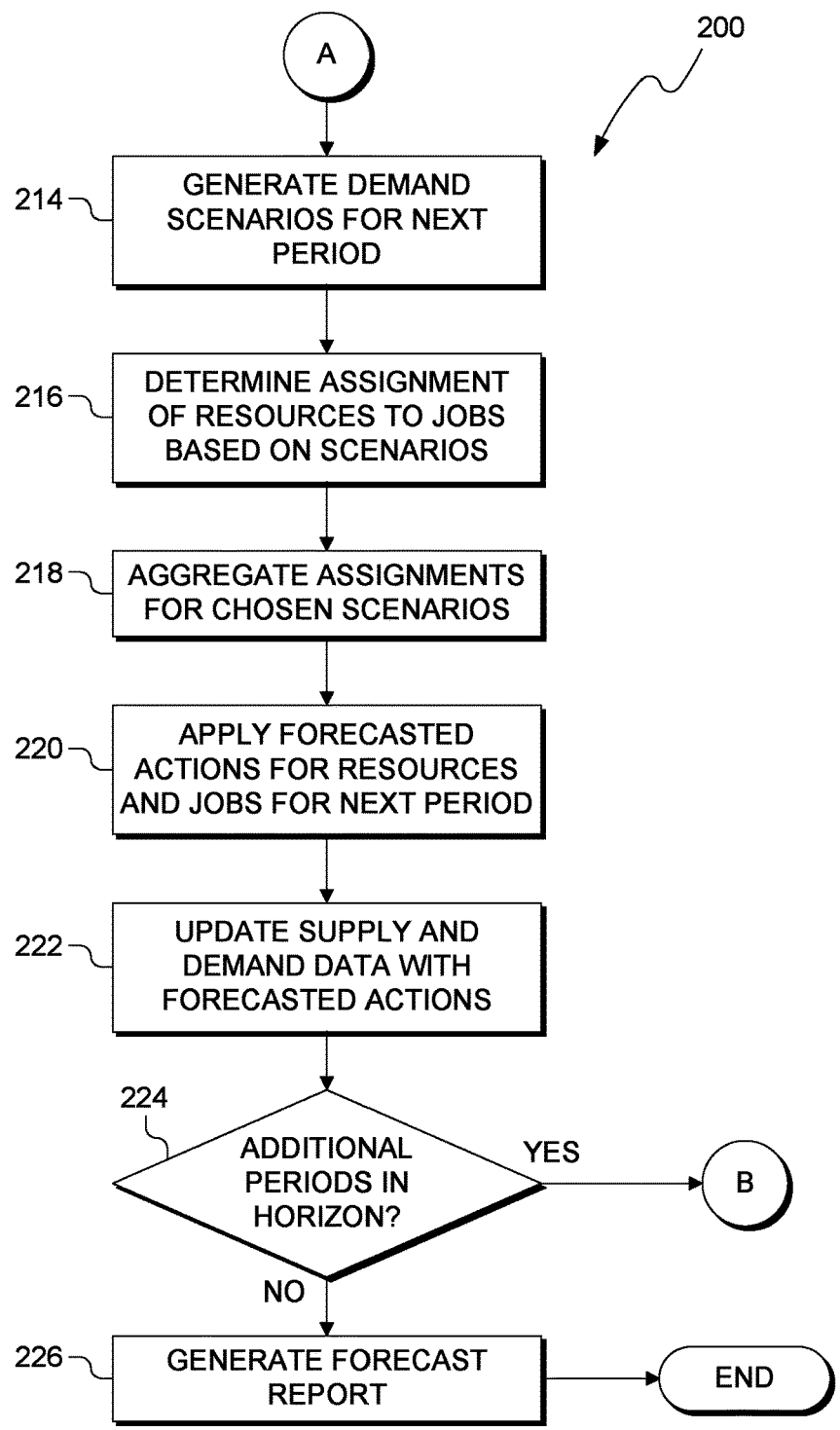

FIGS. 2A & 2B illustrates operational processes, generally designated 200, of forecasting program 112, on device 110 within networked environment 100 of FIG. 1, in accordance with an exemplary embodiment of the present invention.

In process 202, forecasting program 112 receives a forecasting horizon from a user. The forecasting horizon is a date, sometime in the future, that forecasting program 112 generates a forecast of supply, for a redeployable resource pool. Similarly, forecasting program 112 generates a demand for one or more jobs a resource of the resource pool may be assigned to throughout the forecasting horizon. In some embodiments, forecasting program 112 receives a period (e.g., weekly, monthly, or use defined) to create separate forecasts. For each period, forecasting program 112 generates a forecast for assignment and usage of resources during the period. In process 204, forecasting program 112 retrieves the current supply data 114 and demand data 116. Supply data 114 includes information describing one or more resources in a resource pool. Additionally, supply data 114 includes a description of the state of the resource (i.e., whether the resource is assigned to a job, unassigned or benched from any jobs, or retired or exited from the resource pool). Demand data 116 includes information describing one or more jobs that are ongoing, need to be fulfilled, or, in some scenarios, previously completed jobs.

In process 206, forecasting program 112 determines a forecast of jobs for the forecasting horizon. Forecasting program 112 analyzes demand data 116 to determine trends in previous and current jobs that used or employed similar resources in type to the resources in supply data 114. Based on the analysis, forecasting program 112 determines a forecast of jobs including, but not limited to, the number of jobs, the type of jobs, the requirements of the jobs, and the duration of the jobs. In process 208, forecasting program 112 determines predictions regarding the state of the resources in the resource pool for the next period. Assigned resources may continue to be assigned a job, be benched from a job (e.g., completed a job or a job's requirements have changed), or exit the resource pool (an employee quits or a piece of equipment needs repairs). Forecasting program 112 determines a probability the resources will be in each of the three states at the end of the period (i.e. at the start of the next period).

In process 210, forecasting program 112 generates a plurality of supply scenarios for the next period. For each resource, forecasting program 112 creates multiple scenarios that are distributed based on the predicted values determined in process 208. For example, forecasting program 112 predicts a resource has a 40% probability the resource is assigned to the same job next period, a 40% probability that the resource will be benched, and a 20% probability the resource will exit the resource pool. In response, forecasting program 112 creates a number of scenarios to reflect the distribution (e.g., 20 scenarios where the resource is assigned to the same job next period, 20 scenarios where the resource will be benched, and 10 scenarios the resource will exit the resource pool. In process 212, forecasting program 112 creates backfill jobs in demand data 116 for any resource indicated as exited in the current periods supply data 114.

In process 214, forecasting program 112 generates a plurality of demand scenarios for the next period. For each job forecasted to begin in the next period, or current or predicted jobs that are not assigned a resource, forecasting program 112 creates a demand scenario for the job including the type and other attributes of the resource needed for the job. In some embodiments, forecasting program 112 alters one or more scenarios for a given job to reflect possible variances the job may have during the current period. For example, the duration of the job may change, where in some scenarios the job will be completed during the current period and in others the job will continue into the next period.

In process 216, forecasting program 112 determines an assignment for the resources in supply data 114 and jobs in demand data 116 for the current period. Forecasting program 112 determines a solution that maximizes the number of assignments based on the supply and demand scenarios. Forecasting program 112 ensures that assigned supply and demand scenarios are feasible (e.g., the resource has the skills or features required by the job). Additionally, when forecasting program 112 assigns a resource scenario to a job scenario, the other scenarios associated with the job and resource are not included in the final chosen assignment decision. In some embodiments, forecasting program 112 determines an assignment of resources to jobs with additional constraints, such as a business strategy. For example, forecasting program 112 also requires that a resource is new. In process 218, forecasting program 112 aggregates the chosen assignments determined in process 216. For each assigned resource and job, unassigned resource or job, and exited resource, forecasting program 112 collects the chosen scenarios into the respective actions. For previously assigned resources, the actions include the resource maintaining assigned, the resource being benched, and the resource exiting the resources pool. For previously benched resources, the resource can be assigned during the period, remain benched, or exiting the resources pool.

In process 220, forecasting program 112 determines an action to perform to the assigned resource and job based on the aggregation. For resources to be assigned during the period, the use of the resource is applied to the attributes of the resource. For example, the amount and intensity of the job changes the condition attribute of the resource. Benched resources will maintain the attributes, due to not being in use. Furthermore, the assignment history is updated for the resource to track the usage of the resource during the forecast. For assigned jobs, the amount of completion is updated. For jobs that are completed during the period the assigned resource is benched and the completed attribute is updated for the job. Based on the forecasted action, forecasting program 112 updates the attributes of resources in supply data 114 and jobs in demand data 116 (process 222). In process 222, any state changes to the resource during the next period are made. For assigned resources, changes to the attributes reflect the job the resource was assigned to during the forecasted period. Similarly, the attributes of job with assigned resources are updated to reflect the progress of the job and the assigned resource. Supply data 114 now includes the predicted state of each resource for the next period and history of the resource's usage as a result of the assignment. Demand data 116 now includes the assignment status of the jobs the resource pool services, in addition to the completion status of the job.

In process 224, forecasting program 112 determines if there are any remaining periods in the forecasting horizon. If one or more periods remain in the forecast (YES branch of process 224), then forecasting program 112 repeats processes 208 to 222 for the following period. If no more periods remain in the horizon (NO branch of process 224), then forecasting program 112 generates a forecast report including the assignment and state history of each resource and job (process 226). The report includes the assignments, state and other attributes of each resource and job separated for each period of the forecasting horizon.

Figure 3:
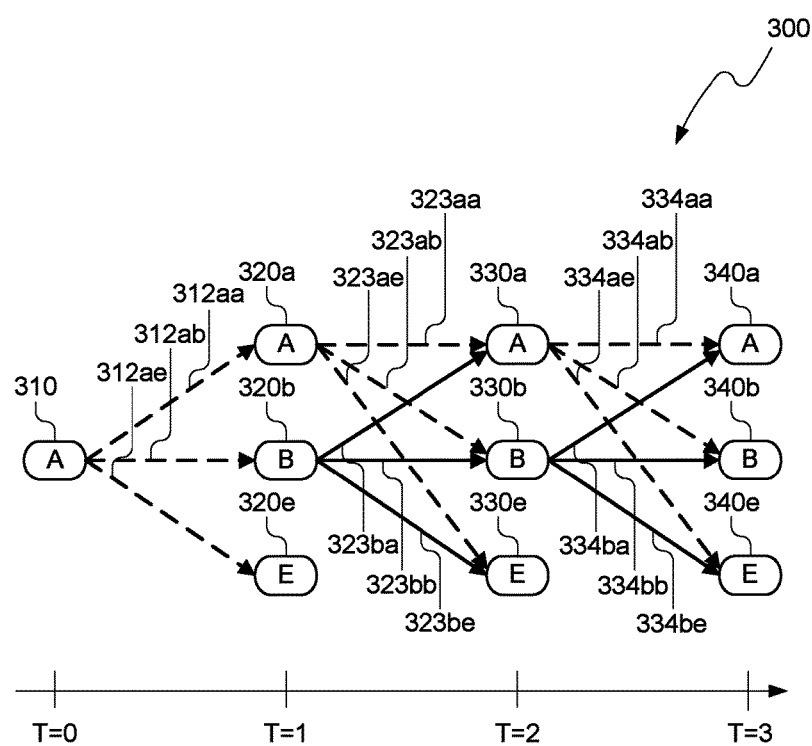
FIG. 3 illustrates and example state diagram for a redeployable resource, in accordance with an exemplary embodiment of the present invention.

FIG. 3 illustrates and example state diagram 300 for a redeployable resource, in accordance with an exemplary embodiment of the present invention. FIG. 3 includes aggregated states for assigned resources 310, 320a, 330a, and 340a (i.e., A); aggregated states for benched resources 310, 320b, 330b, and 340b (i.e., B); and aggregated states for exited resources 310, 320e, 330e, and 340e (i.e., E). Assigned resources 310 represents all assigned resources during the current period (i.e., T=0). Assigned resources 320a, benched resources 320b, and exited resources 320e represent forecasting states of the resource at future time period T=1. Assigned resources 330a, benched resources 330b, and exited resources 330e represent forecasting states of the resource at future time period T=2. Assigned resources 340a, benched resources 340b, and exited resources 340e represent forecasting states of the resource at future time period T=3.

As discussed herein, forecasting program 112 predicts the state of assigned resources. Dotted lines 312aa, 312ab and 312ae indicate the predicted distribution of the currently assigned resources. In some scenarios, a portion of the assigned resources are predicted to maintain the currently assigned state into the next period (e.g., line 312aa). In future periods, lines 323aa and 334aa represent assigned resources being predicted to maintain the assigned state. Resources that maintain the assigned state between periods are assumed to continue assignment to a job. In some scenarios, a portion of the assigned resources is predicted to transition from being in currently assigned state into a benched state during the next period (e.g., line 312ab). In future periods, lines 323ab and 334ab represent assigned resources that are benched from the predicted assignments. For example, a resource is benched because the job is finished. In some scenarios, a portion of the assigned resources exits the resource pool during the next period (e.g., line 312*ae*). In future periods, lines 323*ae* and 334*ae* represent assigned resources that exit the resource pool. For example, a resource may be past the useful life of the resource (e.g., a piece of equipment has a predicted lifespan and is sold after the lifespan is reached) and can no longer be used to fulfill jobs.

Solid lines 323*ba*, 323*bb*, 323*be*, 334*ba*, 334*bb*, and 334*be* represent forecasting program 112 determining assignments of benched resources for future periods. When benched, a resource is not currently assigned a job and is ready to be assigned a job during the period. Lines 323*ba* and 334*ba* illustrate a transition between a resource being benched and assigned to a new job. Forecasting program 112 determines a demand forecast for each period in the horizon. Unfulfilled jobs (e.g., jobs that either start in the period or jobs that were previously assigned, such as previously assigned resources indicated by 312*ab*, 312*ae*, 323*ab*, 323*ae*, 334*ab* and 334*ae*) may be assigned benched resources (e.g., 320*e*, 330*e* and 340*e*) during the forecasted period. Some benched resources may not be assigned a job, as indicated by 323*bb* and 334*bb*, and remain benched during the forecasted period. And other benched resources may exit the resource pool, as indicated by 323*be* and 334*be*.

As will be readily apparent to one of ordinary skill, by tracking predicted resource states a detailed report can be provided by forecasting program 112. The state of each resource for each period is provided. Additionally any predicted assignments of a resource and a job is provided. A user who is provided the report can determine usage trends and also potential unused (i.e., benched resources). As such the user can respond to potential unused resources by finding new demand (i.e., jobs) not currently present in the forecast to increase utilization of the resource pool.

Figure 4:
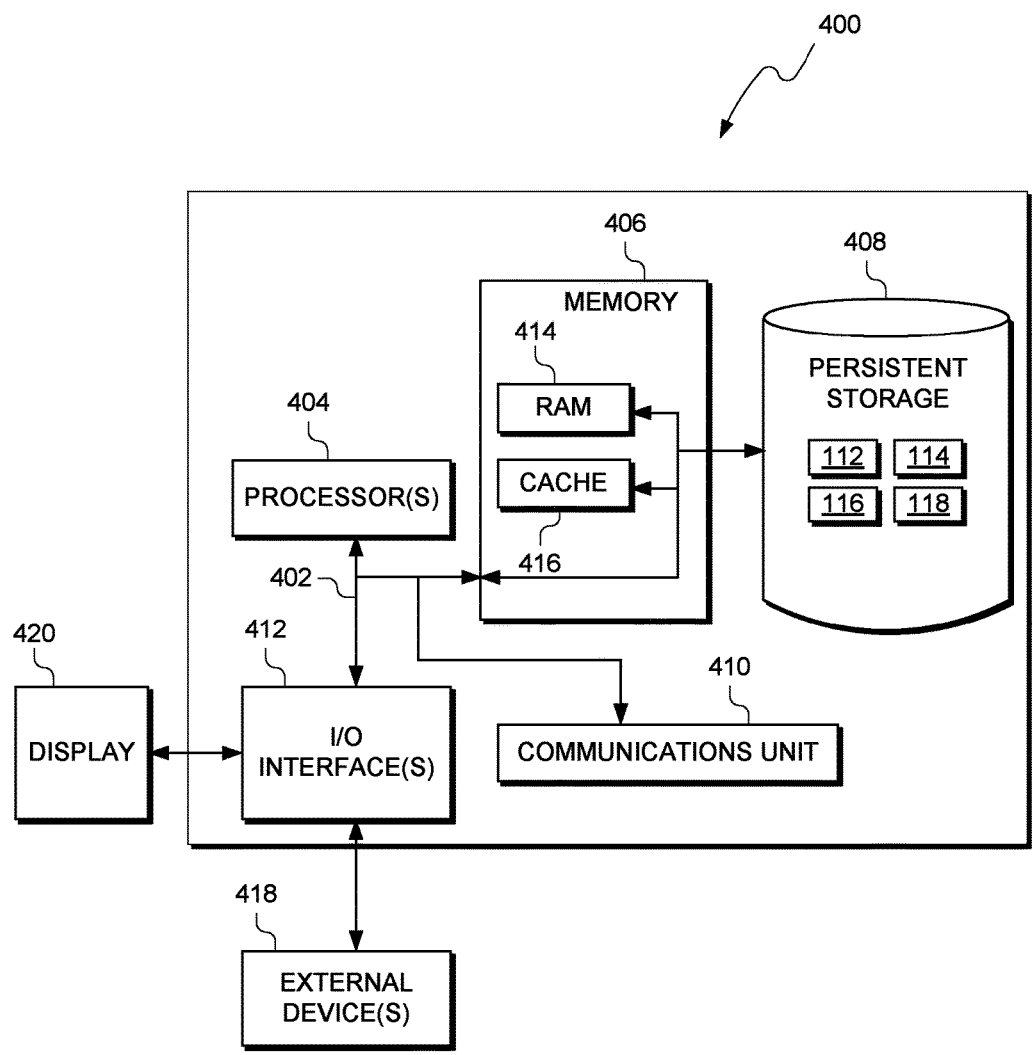
FIG. 4 depicts a block diagram of components of the computing device executing a forecasting program, in accordance with an exemplary embodiment of the present invention.

FIG. 4 depicts a block diagram, 400, of components of computing device 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Forecasting program 112, supply data 114, demand data 116 and forecast data 118 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage X08.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. Forecasting program 112, supply data 114, demand data 116 and forecast data 118 may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., forecasting program 112, supply data 114, demand data 116 and forecast data 118, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for forecasting usage of resources, the method comprising:
   determining, by one or more processors, a forecast for a plurality of jobs;
   determining, by the one or more processors, an assignment of a unassigned resource of the plurality of resources to a forecasted job of the plurality of jobs, wherein the unassigned resource is available for assignment to the forecasted job;
   determining, by the one or more processors, a probable utilization of the unassigned resource, wherein the probable utilization of the unassigned resource indicates the probability that the unassigned resource will be deployed during assignment to the forecasted job; and in response to the probable utilization of the unassigned resource being below a predetermined value, generating, by the one or more processors, a report including the assignment state of the unassigned resource and probable utilization of the unassigned resource by the forecasted job.

2. The method of claim 1, the method further comprising determining, by the one or more processors, a probability of a future usage for an assigned resource included in a plurality of resources, wherein the probability of a future usage for the plurality of resources is distributed among (i) the assigned resource maintaining assignment to an assigned job during a next period in the forecast, (ii) the assigned resource being unassigned from the assigned job during the next period in the forecast, and (iii) the assigned resource being removed from assignment to the assigned job during the next period in the forecast.

3. The method of claim 2, the method further comprising:
retrieving, by the one or more processors, a decision tree, wherein the decision tree determines the future usage for the assigned resource of the plurality of resources;
generating, by the one or more processors, a plurality of pruned decision trees, wherein the plurality of pruned decision trees exclude a portion of the decision tree; and
determining, by the one or more processors, a distribution of outcomes from the plurality of pruned decision trees, wherein the distribution of outcomes determines the probability of the future usage for the assigned resource.

4. The method of claim 1, the method further comprising:
generating, by the one or more processors, a plurality of supply scenarios for the unassigned resource of the plurality of resources; and
generating, by the one or more processors, a plurality of demand scenarios for the job of the plurality of jobs.

5. The method of claim 4, wherein the assignment for the unassigned resource to the job of the plurality of jobs is based, at least in part, on (i) matching a supply scenario of the plurality of supply scenarios to a demand scenario of the plurality of demand scenarios and (ii) the unassigned resource fulfilling a requirement of the job.

6. The method of claim 5, the method further comprising:
responsive to the assignment, updating, by the one or more processors, at least one attribute of the resource and at least one attribute of the job.

7. The method of claim 4, the method further comprising:
generating, by the one or more processors, a plurality of supply scenarios for the unassigned resource of the plurality of resources, wherein the current state of the unassigned resource is retired.

* * * * *